United States Patent [19]

Moriyama

[11] Patent Number: 4,901,092

[45] Date of Patent: Feb. 13, 1990

[54] INK JET RECORDING HEAD USING A PIEZOELECTRIC ELEMENT HAVING AN ASYMMETRICAL ELECTRIC FIELD APPLIED THERETO

[75] Inventor: Jiro Moriyama, Yokohama, Japan

[73] Assignee: Canon Kabushiki Kaisha, Tokyo, Japan

[21] Appl. No.: 252,002

[22] Filed: Sep. 30, 1988

Related U.S. Application Data

[63] Continuation of Ser. No. 941,362, Dec. 15, 1986, abandoned.

[30] Foreign Application Priority Data

Dec. 17, 1985 [JP] Japan ................................ 60-281863

[51] Int. Cl.⁴ ........................... G01D 15/16; B41J 3/04

[52] U.S. Cl. ................................. 346/140 R; 310/369

[58] Field of Search ................ 346/140; 310/369, 367, 310/368; 417/322; 239/102.2

[56] References Cited

U.S. PATENT DOCUMENTS

| | | | |
|---|---|---|---|
| 3,683,212 | 8/1972 | Zoltan | 346/140 X |
| 3,924,974 | 12/1975 | Fischbeck | 417/322 |
| 4,245,227 | 1/1981 | Krause | 346/140 X |
| 4,288,799 | 9/1981 | Uzawa et al. | 346/140 R |
| 4,306,245 | 12/1981 | Kasugayama et al. | 346/140 R |
| 4,342,041 | 7/1982 | Kasugayama et al. | 346/140 R |
| 4,368,477 | 1/1983 | Heinzl | 346/140 |
| 4,390,886 | 6/1983 | Sultan | 346/140 |
| 4,395,719 | 7/1983 | Majewski | 346/140 |
| 4,429,320 | 1/1984 | Hattori et al. | 346/140 R |
| 4,499,479 | 2/1985 | Lee | 346/140 |
| 4,560,997 | 12/1985 | Sato et al. | 346/140 R |
| 4,578,686 | 3/1986 | Vollert | 346/140 |

*Primary Examiner*—Joseph W. Hartary

*Attorney, Agent, or Firm*—Fitzpatrick, Cella, Harper & Scinto

[57] ABSTRACT

An ink jet recording head includes a piezoelectric element with an outer cross-sectional shape having opposed, curved first surfaces and opposed second surfaces, which may be formed by cutting off opposite sides of a circular cross-section piezoelectric element on diametrically opposed chords. An electric field applied to the piezoelectric element is stronger in one direction than another, thereby increasing the discharge efficiency of the ink jet head.

16 Claims, 5 Drawing Sheets

INK JET RECORDING HEAD USING A PIEZOELECTRIC ELEMENT HAVING AN ASYMMETRICAL ELECTRIC FIELD APPLIED THERETO

This application is a continuation of application Ser. No. 941,362, filed Dec. 15, 1986, now abandoned.

BACKGROUND OF THE INVENTION

1. Field of the Invention

The present invention relates to an ink jet recording head of an ink jet recorder for recording characters or images by discharging ink droplets toward a recording medium, and more particularly to such an ink jet recording head which uses a piezoelectric element as an electro-mechanical transducer for discharging the ink droplets.

2. Related Background Art

An ink jet recording head of this type has been proposed by U.S. Pat. No. 3,683,212 by Gould Inc. In this head, as shown in FIG. 1A, a cylindrical piezoelectric element 1 is polarized on its inner circumference and outer circumference, and a positive pulse voltage shown in FIG. 2 generated in response to an input signal by a pulse generator 2 is applied in the same direction as the polarization so that an impact stress is applied to the piezoelectric element 1 to cause a nozzle 4 to discharge an ink as an ink droplet 3 stored in the piezoelectric element. Arrows in FIG. 1B show the directions of polarization.

After the ink droplet has been discharged, the ink surface at the end of the nozzle 4 is retracted but the surface tension of the ink at the nozzle acts to increase a radius of curvature of the ink surface. Thus, the ink is supplied into the nozzle 4 through an ink supply path 5.

However, since a sectional shape of the piezoelectric element 1 of the prior art head is concentric and circular, when a plurality of heads are arranged in parallelly to form a multi-nozzle structure in order to increase the print speed or allow multi-color printing, a section of the entire head assembly includes a series of circles as shown in FIG. 3. Thus, when the diameter of the piezoelectric element 1 is represented by d, a pitch P1 between the centers of the nozzles 4 must be larger than d ($P1>d$). Thus, the head assembly is of large size for the multi-nozzle ink jet recording head.

On the other hand, in a piezoelectric element of such shape, if electrodes are arranged on the entire surfaces of the inner and outer circumferences of the cylinder and a voltage is applied thereacross, the cylindrical element is deformed in the inner circumference as shown in FIG. 4 by a reverse-piezoelectric effect. A solid line shows the original inner circumference of the piezoelectric element 1 and a broken line shows the inner circumference after the application of the voltage, and $\Delta l$ and $\Delta d$ represent variances of length and diameter. Thus, the length l changes to $l+\Delta l$ while the diameter d changes to $d-\Delta d$. In the ink jet recording head of this type, since the electrodes of the piezoelectric element 1 are arranged over the entire surfaces of the inner circumference and the outer circumference of the cylinder, the manufacture of such a device is not easy. A piezoelectric vibration mode is a combination of a longitudinal vibration and a lateral vibration and the cylindrical shape is maintained after the deformation. Accordingly, a sufficient electro-mechanical transducing efficiency is not attained.

SUMMARY OF THE INVENTION

It is an object of the present invention to provide a high performance ink jet recording head which resolves the above problems.

In accordance with the present invention, in an ink jet recording head for discharging ink droplets to a recording medium by a hollow piezoelectric element to record characters or image, the length of the piezoelectric element on a cross-sectional plane along a predetermined direction is different from a length along the orthogonal direction.

In accordance with the ink jet recording head of the present invention, no electrode is arranged on an inner circumference of the hollow piezoelectric element and electrodes are arranged only on an outer circumference.

In accordance with the ink jet recording head of the present invention, in order to discharge ink droplets to a recording medium by the hollow piezoelectric element to record characters or images, the outer circumference of the piezoelectric element has a plurality of electrodes arranged thereon which are not identical but a portion thereof is eliminated or of opposite polarity.

In the present invention, since the length of the piezoelectric device along one direction on the sectional plane is shorter than the length along the other direction, the length of the multi-nozzle assembly having a number of nozzles so arranged is short and a compact recording head is attained.

Since one surface of the piezoelectric element has no electrode or has electrodes of opposite polarity the manufacture of the device is easy and the deformation due to the application of voltage does not occur toward the center but is limited in a certain direction. Thus, the electro-mechanical transducing efficiency is improved.

A plurality of electrodes are arranged and positive pulse voltages of opposite polarity are applied to positive electrodes and negative electrodes in accordance with polarization to apply a contact force in one direction and a tensional force in the orthogonal direction. Thus, deformation is readily attained, the electro-mechanical transducing efficiency is improved and the response is also improved.

It is an object of the present invention to provide an ink jet recording head having a hollow piezoelectric element, the deformation of the hollow piezoelectric element which is caused by the application of voltage to the piezoelectric element causing ink which may be filled in the hollow piezoelectric element to be discharged toward a recording medium, and the cross-sectional shape of the outer surface of hollow piezoelectric element in a plane perpendicular to the direction in which the ink is discharged being noncircular.

It is further object of the present invention to provide an ink jet recording head having a hollow piezoelectric element, the deformation of the hollow piezoelectric element which is caused by the application of voltage to the piezoelectric element causing ink which may be filled in the hollow piezoelectric element to be discharged toward a recording medium, and the piezoelectric element having an electrode for voltage application being arranged only one of outer surface side and inner circumference of said hollow piezoelectric element.

DETAILED DESCRIPTION OF THE PREFERRED EMBODIMENTS

Figure 5A:
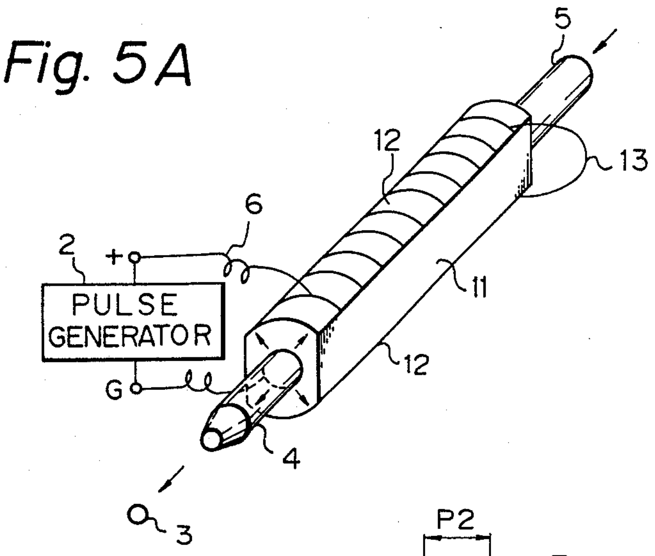
FIG. 5A shows a perspective view of a nozzle and a piezoelectric element of one embodiment of an ink jet recording head of the present invention.
Figure 5B:
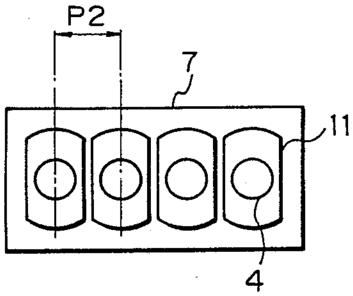
FIG. 5B shows a front view of a multi-nozzle assembly by a plurality of heads shown in FIG. 5A, FIGS. 6A and 6B show a perspective view and a front view for illustrating the deformation of an inner circumference of the piezoelectric element shown in FIG. 5A, FIGS. 7A to 7F show perspective views of other embodiments of the piezoelectric element of the present invention.

FIG. 5A shows an external view of one embodiment of a piezoelectric element of the present invention, and FIG. 5B shows a multi-head assembly comprising a plurality of such piezoelectric elements. Numeral 11 denotes a piezoelectric element, numeral 12 denotes an upper or lower electrode and numeral 13 denotes a wire for interconnecting the electrodes 12. Arrows in FIGS. 5A and 5B show the directions of polarization. As shown in FIG. 5A, the cylindrical piezoelectric element 11 has its both sides cut off to provide opposed, curved first surfaces and opposed second surfaces, so that the horizontal length on a cross-sectional plane is shorter than the vertical length, and the electrodes 12 are closely arranged to each other only on an upper surface and a lower surface. Also, the cross-sectional configuration of the outer surface of element 12 includes an arc portion.

Figure 1A:
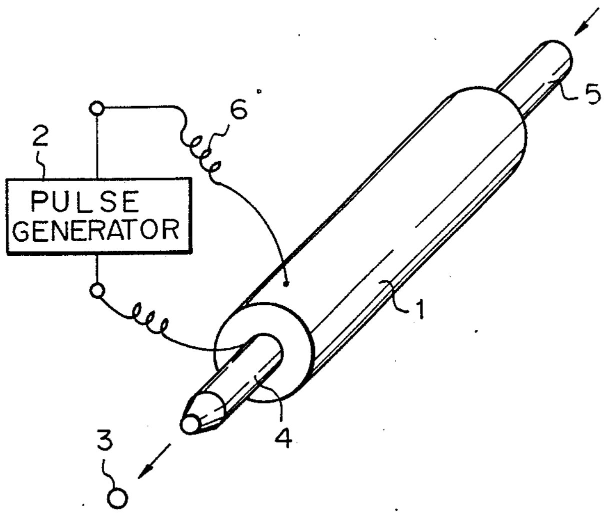
Fig. 1A PRIOR ART
FIG. 1A shows a perspective view of a nozzle and a piezoelectric element in a prior art ink jet recording head.
Figure 1B:
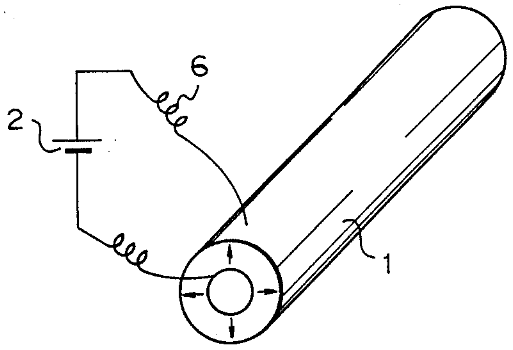
Fig. 1B PRIOR ART
FIG. 1B shows a perspective view for the illustrating polarization directions of the piezoelectric element.
Figure 2:
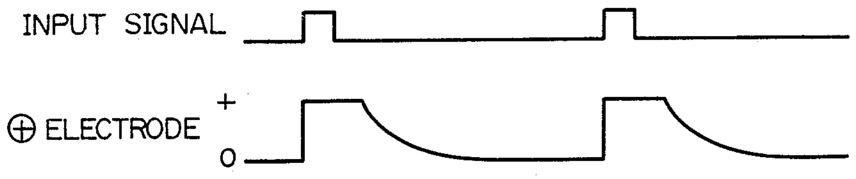
Fig. 2 PRIOR ART
FIG. 2 shows waveforms of pulse voltages applied to electrodes of the piezoelectric element in the prior art head shown in FIG. 1A.

In a print operation, a positive pulse voltage shown in FIG. 2 and generated by a pulse generator 2 is applied to the upper and lower electrodes 12 through the wires 6.

Figure 6A:
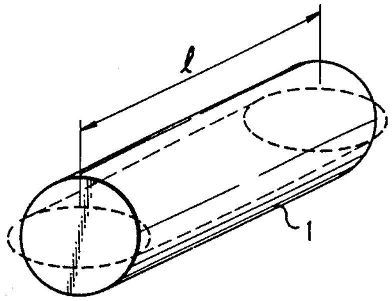
Figure 6B:
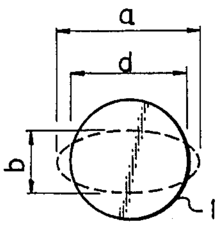

When the voltage is applied to the electrodes 12, the axial length l of the piezoelectric element 11 does not change but its vertical length is shortened and its horizontal length is expanded as shown in FIG. 6. Because the contraction occurs only in one direction, the circular inner circumference having a diameter d before the application of the voltage changes to an ellipse inner circumference having a major axis a and a minor axis b.

For a normal material used in the piezoelectric element, a longitudinal piezoelectric constant d33 in the same direction as that of the applied electric field is several times as large as a lateral piezoelectric constant d31 in the orthogonal direction. In an experiment, d31 is approximately $2.9\times 10$ m/V while d33 is approximately $6.4\times 10$ m/V.

Figure 4:
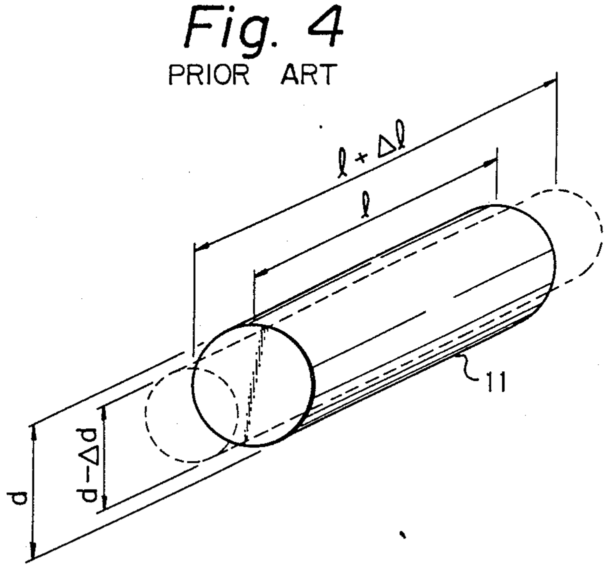
Fig. 4 PRIOR ART
FIG. 4 shows a perspective view for illustrating deformation of the inner circumference of the prior art piezoelectric element shown in FIG. 1A.

Thus, in accordance with the present embodiment, the piezoelectric element 11 is deformed much more efficiently than the prior art piezoelectric element shown in FIG. 4.

Figure 3:
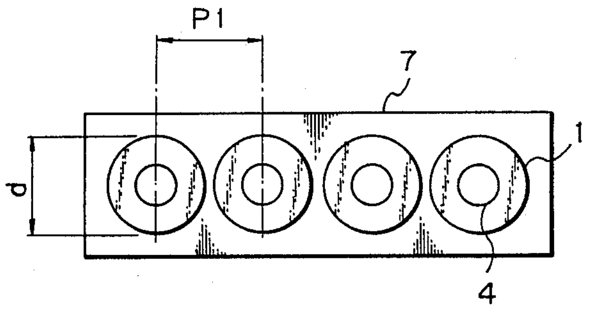
Fig. 3 PRIOR ART
FIG. 3 shows a front view of a multi-nozzle assembly by arranging a plurality of prior art heads.

In accordance with the present embodiment, the electro-mechanical transducing efficiency is thus improved. Further, since the shape of the piezoelectric element 11 is not circular but the horizontal length is shorter than the vertical length, when a multi-nozzle assembly is to be constructed by a plurality of piezoelectric elements, a pitch P2 of the piezoelectric elements 11 is much smaller than the pitch P1 of the conventional piezoelectric elements shown in FIG. 3 and the overall width of the nozzle assembly 7 is short.

FIGS. 7A to 7F show other embodiments of the piezoelectric element of the present invention.

Figure 7A:
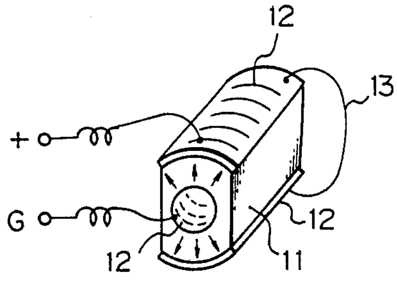

The piezoelectric element 11 in FIG. 7A is similar to that of the embodiment shown in FIG. 5A except that the electrodes 12 are removable plates.

Figure 7B:
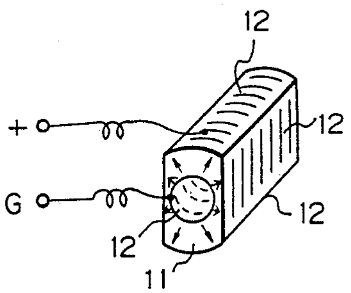

In FIG. 7B, the inner circumference of the piezoelectric element 11 is grounded and the outer surface is positive.

Figure 7C:
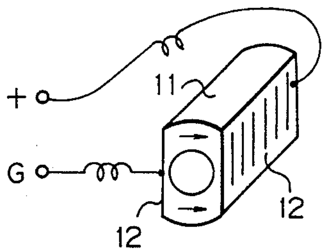

In FIG. 7C, no electrode is arranged on the inner circumference of the piezoelectric element 11 and one side (left outer side) of the piezoelectric element 11 is grounded while the other side (right outer side) is used as a positive electrode. The polarization occurs laterally as shown by arrows.

Figure 7D:
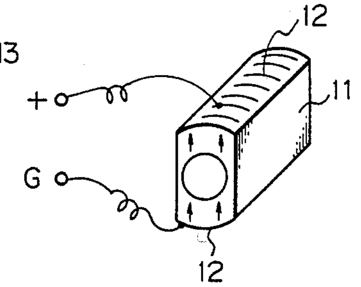

In FIG. 7D, no electrode is arranged on the inner circumference of the piezoelectric element 11, the outer lower surface of the piezoelectric element 11 is grounded and the outer upper surface is used as a positive electrode. The polarization occurs vertically or longitudinally as shown by arrows.

Figure 7E:
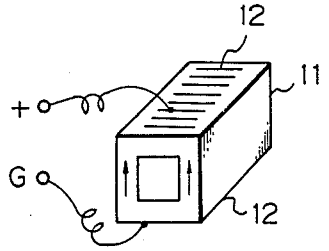
Figure 7F:
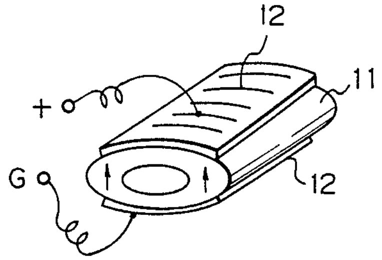

In FIG. 7E, the shape of the piezoelectric element 11 is oblong, and more specifically rectangular, the cross-sectional shape of the outer surface of element is square, and the element is polarized vertically. In FIG. 7F, the cross-sectional shape of the piezoelectric element 11 is generally oblong, and more specifically is elliptical, and the element is polarized vertically. The polarization directions in both embodiments are same as that in the embodiment of FIG. 7D. The elongated piezoelectric element 11 shown in FIG. 7F may be used when a multi-head assembly is to be constructed by longitudinally (vertically) arranging a plurality of piezoelectric elements or laterally arranging them to reduce the thickness of the head assembly.

The sectional shape of the piezoelectric element 11 is not limited to those shown in the above embodiments but may also encompass a laterally or longitudinally asymmetric sectional shape. The electrodes of the piezoelectric element 11 need not be identical on the inner circumference (that is, the hollow portion extending along the ink guiding path) or outer circumference of the piezoelectric element 11, but a portion thereof may be eliminated or may be of opposite polarity. As a result, the strain can be readily applied and the energy can be efficiently transmitted to the ink in the piezoelectric element 11.

Figure 8:
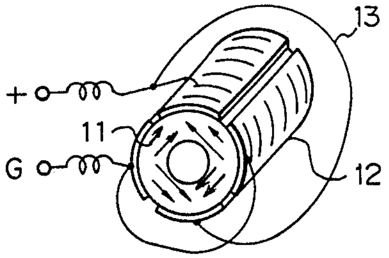
FIGS. 8 and 9 show perspective views of further embodiments of the piezoelectric element of the present invention.
Figure 9:
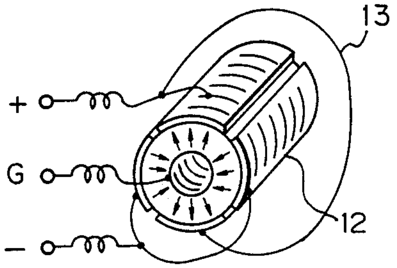

FIGS. 8 and 9 show other embodiments of the present invention. In FIG. 8, (showing the case where one surface of the piezoelectric element has plural electrodes which are of opposite polarities), four electrodes 12 are mounted on the outer circumference of the cylindrical piezoelectric element 11 to divide it into four sectors. A pair of opposing upper and lower surfaces are used as positive electrodes and a pair of opposing left and right surfaces are grounded. The directions of polarization are grounded. The directions of polarization are shown by arrows.

Figure 10:
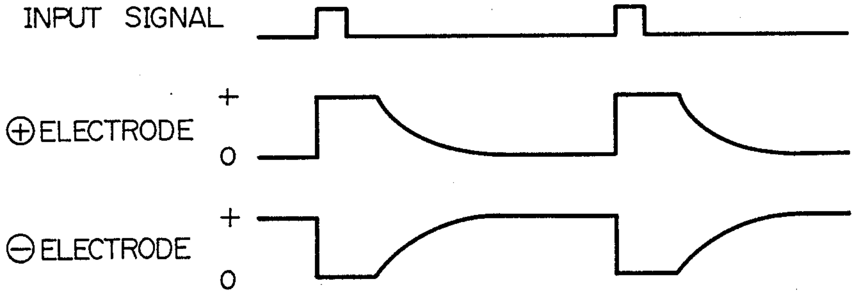
FIG. 10 shows waveforms of pulse voltages applied to the electrodes of the piezoelectric element shown in FIG. 9.

In FIG. 9, (showing the case where some electrodes are eliminated) the outer circumference of the cylindrical piezoelectric element 11 is divided into four sectors by four electrodes 12. A pair of opposing upper and lower electrodes are connected to a positive terminal, a pair of opposing left and right electrodes are connected to a negative terminal and the inner circumference of the piezoelectric element 11 is grounded. The polarization directions shown by arrows are directed from the center to the periphery on one hand and are directed from the periphery to the center on the other hand. A voltage waveform applied to the electrodes 12 when the number of electrodes is three is shown in FIG. 10. In the two-electrode structure, a positive voltage is applied to the piezoelectric element 11 in the polarization direction. In the three-electrode structure shown in the embodiment of FIG. 9, the same voltage as that in the two-electrode structure is applied to the positive electrode and a positive voltage of the reverse waveform is applied to the negative electrode 12. Accordingly, as the electrode voltages are generated by the pulse generator 2 in accordance with the input signal, the inner circumference of the piezoelectric element 11 expands toward the positive electrode and contracts toward the negative electrode. Thus, the piezoelectric element 11 is more readily deformed and the electro-mechanical transducing efficiency is improved.

The present invention offers the following significant advantages.

(1) Since the cross-sectional plane of the piezoelectric element is not circular but one of the vertical and horizontal lengths in the cross-sectional plane of the element is shorter than the other, the nozzle density is increased in a multi-nozzle assembly and a compact assembly is obtained.

(2) Because the electrodes are arranged only on the outer side of the piezoelectric element, the manufacturing process is simplified and the manufacturing cost is reduced.

(3) Because the electrodes on the inner or outer circumference of the piezoelectric element are not identical but are arranged only on an axial area to disperse the stress, the electro-mechanical transducing efficiency is improved.

(4) Because a portion of the electrodes on at least one of the outer circumference and inner circumference of the piezoelectric element is eliminated or is of opposite polarity, a mechanical stress can be readily applied and the energy can be efficiently transmitted to the ink in the piezoelectric element. Accordingly, the response is high, the discharge pressure can be readily changed, the pressure range is wide and the durability is high.

I claim:

1. An ink jet recording head including a piezoelectric element having an outer cross-sectional shape in a plane perpendicular to the direction in which ink is discharged therefrom, said shape comprising opposed, curved first surfaces and opposed second surfaces, and having an inner surface defining a hollow portion providing a path for guiding the ink to be discharged from the head, wherein:

one of said first surfaces has an electrode disposed thereon, and said piezoelectric element is deformable by applying a voltage to said electrode to create in said plane an electric field stronger in one direction than in a direction different from said one direction to more efficiently discharge ink.

2. An ink jet recording head according to claim 1, wherein another electrode is disposed on said inner surface and said piezoelectric element is deformable by applying a voltage between said electrodes.

3. An ink jet recording head according to claim 1, wherein another electrode is disposed on one of said second surfaces and piezoelectric element is deformable by applying a voltage between said electrodes.

4. An ink jet recording head according to any one of claims 1 and 3, comprising plural said piezoelectric elements disposed side by side with said second surfaces located adjacent to each other.

5. An ink jet recording head according to claim 1, wherein said shape of said piezoelectric element has a length in one direction different from the length in an orthogonal direction.

6. An ink jet recording head according to claim 5, wherein said electrode is film shaped.

7. An ink jet recording head according to claim 5, wherein said electrode is a plate.

8. An ink jet recording head according to claim 5, wherein said electrode is detachable from said piezoelectric element.

9. An ink jet recording head including a piezoelectric element having an outer cross-sectional shape in a plane perpendicular to the direction in which ink is discharged therefrom, said shape comprising opposed, curved first surfaces and opposed second surfaces, and having an inner surface defining a hollow portion providing a path for guiding the ink to be discharged from the head, wherein:

one of said second surfaces has a first electrode disposed thereon, and said piezoelectric element is deformable by applying a voltage to said electrode to create in said plane an electric field stronger in one direction than in a direction different from said one direction to more efficiently discharge ink.

10. An ink jet recording head according to claim 9, wherein another electrode is disposed on said inner surface said piezoelectric element is deformable by applying a voltage between said electrodes.

11. An ink jet recording head according to claim 9, wherein another electrode is disposed on the other said second surface.

12. An ink jet recording head according to claim 9, comprising plural said piezoelectric elements disposed side by side with said second surfaces located adjacent to each other.

13. An ink jet recording head according to claim 9, wherein said outer shape of said piezoelectric element has a length in one direction different from the length in an orthogonal direction.

14. An ink jet recording head according to claim 13, wherein said electrode is film shaped.

15. An ink jet recording head according to claim 13, wherein said electrode is a plate.

16. An ink jet recording head according to claim 13, wherein said electrode is detachable from said piezoelectric element.

* * * * *

UNITED STATES PATENT AND TRADEMARK OFFICE
CERTIFICATE OF CORRECTION

PATENT NO. : 4,901,092

DATED : February 13, 1990

INVENTOR(S) : JIRO MORIYAMA

It is certified that error appears in the above-identified patent and that said Letters Patent is hereby corrected as shown below:

COLUMN 1

Line 39, "parallelly" should read --parallel--.

COLUMN 2

Line 9, "image;" should read --an image,--.
Line 31, "polarity" should read --polarity,--.
Line 51, "hollow" should read --the hollow--.
Line 62, "arranged" should read --arranged on--.

COLUMN 3

Line 1, "the illustrating" should read --illustrating the--.
Line 48, "element 12" should read --element 11--.

COLUMN 4

Line 37, "element" should read --the element--.

UNITED STATES PATENT AND TRADEMARK OFFICE

CERTIFICATE OF CORRECTION

PATENT NO. : 4,901,092

DATED : February 13, 1990

INVENTOR(S) : JIRO MORIYAMA

It is certified that error appears in the above-identified patent and that said Letters Patent is hereby corrected as shown below:

COLUMN 6

Line 12, "piezoelectric element" should read --said piezoelectric element--.
Line 15, "claims 1 and 3," should read --claims 1 to 3,--.
Line 46, "surface said" should read --surface and said--.

Signed and Sealed this

Thirtieth Day of July, 1991

Attest:

HARRY F. MANBECK, JR.

Attesting Officer

Commissioner of Patents and Trademarks